United States Patent [19]

Leshner

[11] Patent Number: 5,381,771

[45] Date of Patent: Jan. 17, 1995

[54] LEAN BURN MIXTURE CONTROL SYSTEM

[75] Inventor: Michael D. Leshner, Columbia, Md.

[73] Assignee: Lean Power Corporation, Silver Spring, Md.

[21] Appl. No.: 133,374

[22] Filed: Oct. 8, 1993

Related U.S. Application Data

[63] Continuation-in-part of Ser. No. 920,855, Jul. 28, 1992, Pat. No. 5,251,601.

[51] Int. Cl.6 ............................................. F02M 7/00
[52] U.S. Cl. ................................... 123/436; 123/585; 123/443
[58] Field of Search ............... 123/436, 443, 492, 493, 123/585, 589, 309, 590; 60/274; 364/431.01

[56] References Cited

U.S. PATENT DOCUMENTS

| | | | |
|---|---|---|---|
| 2,628,606 | 2/1953 | Draper et al. | 123/443 |
| 3,789,816 | 2/1974 | Taplin et al. | 123/443 |
| 4,015,569 | 4/1977 | Leshner et al. | 123/585 |
| 4,015,572 | 4/1977 | Leshner et al. | 123/436 |
| 4,026,251 | 5/1977 | Schweitzer et al. | 123/443 |
| 4,051,672 | 10/1977 | Masaki et al. | 123/443 |
| 4,056,931 | 11/1977 | Hata | 60/274 |
| 4,068,473 | 1/1978 | Masaki | 123/443 |
| 4,099,493 | 7/1978 | Latsch et al. | 123/443 |
| 4,104,990 | 8/1978 | Frobenius | 123/436 |
| 4,123,901 | 11/1978 | Masaki et al. | 60/277 |
| 4,132,198 | 1/1979 | Masaki et al. | 123/443 |
| 4,161,162 | 7/1979 | Latsch et al. | 123/443 |
| 4,231,335 | 11/1980 | Hallberg et al. | 123/443 |
| 4,232,643 | 11/1980 | Leshner et al. | 123/585 |
| 4,368,707 | 1/1983 | Leshner et al. | 123/436 |
| 4,827,887 | 5/1989 | Leshner | 123/443 |
| 5,021,960 | 6/1991 | Manaka et al. | 364/431.01 |
| 5,101,791 | 4/1992 | Kuettner et al. | 123/436 |
| 5,224,452 | 7/1993 | Tomizawa | 123/436 |
| 5,275,142 | 1/1994 | Kapellen et al. | 123/436 |

Primary Examiner—Raymond A. Nelli
Attorney, Agent, or Firm—George T. Marcou

[57] ABSTRACT

An automatic control system is shown to vary the mixture of fuel-to-air in a conventional internal combustion engine to minimize resulting pollutants and maximize engine efficiency and performance. The system senses manifold vacuum and engine acceleration and based, in part, upon such inputs forces the mixture leaner until an instability event is detected at which time the system rapidly forces the mixture richer at a predetermined rate and time period to overcome the instability. The mixture is then again gradually forced leaner. The rate of leaning is controlled by the vacuum pressure so that no leaning occurs at or near full throttle and the rate of leaning is decreased either gradually or incrementally as power requirements decrease. The air-to-fuel ratio may be adjusted by regulating the introduction of secondary air or by adjusting the quantity of fuel injection. A control system for individually monitoring and correcting fuel injection rates of individual cylinders is provided. Another embodiment of the control system includes an improved vacuum operated air valve for disabling the leaning function when the throttle is fully closed or fully open. The lean burn control system may be combined with either an exhaust gas recirculation system or a water injection system.

26 Claims, 16 Drawing Sheets

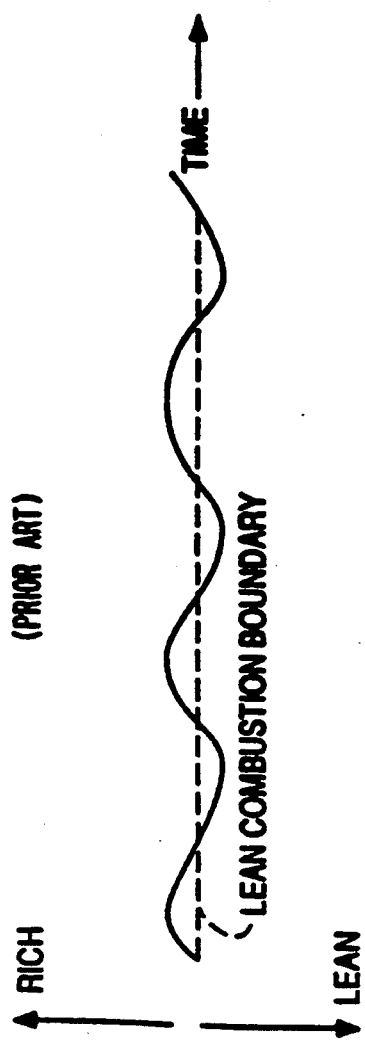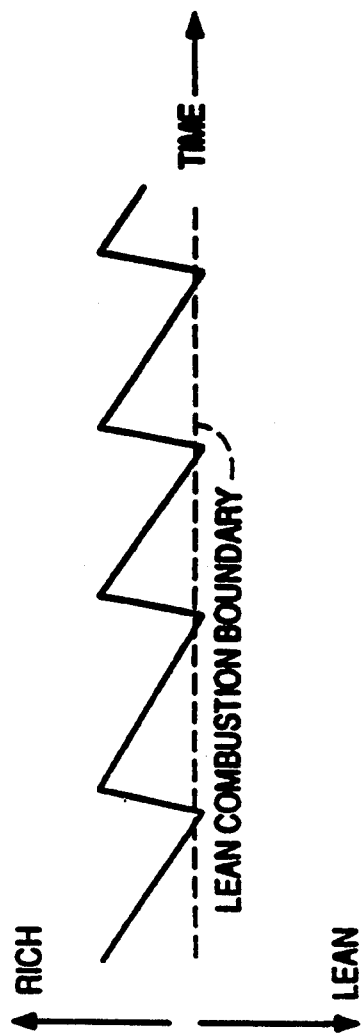

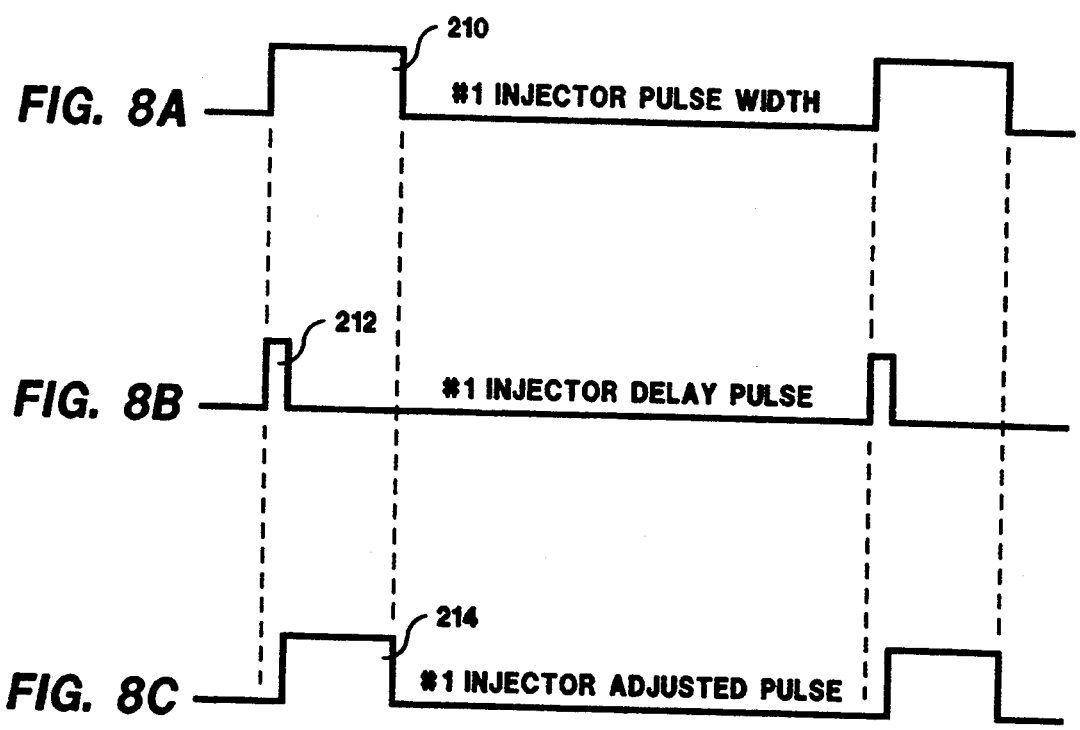

LEAN BURN MIXTURE CONTROL SYSTEM

This is a continuation-in-part application from application Ser. No. 07/920,855, filed Jul. 28, 1992, naming Michael D. Leshner as inventor which has been allowed and assigned U.S. Pat. No. 5,251,601.

FIELD OF THE INVENTION

The present invention relates to a control system to regulate automatically the ratio of air-to-fuel in an internal combustion engine to maintain a lean burn mixture based, in part, upon the rate of change of engine speed and manifold vacuum levels. The air-to-fuel ratio may be adjusted by regulating the introduction of secondary air or by adjusting the quantity of fuel injection. Further, lean burn mixture control systems compatible with exhaust gas recirculation and water injection are disclosed.

BACKGROUND OF THE INVENTION

It is well known in the art that lean fuel/air mixtures may be used advantageously to produce relatively low levels of exhaust emissions and relatively low fuel consumption. However, drivability often suffers when lean mixtures are employed, because mixtures which are slightly "too lean" result in a markedly increased incidence of combustion instability. Combustion instability results in poor drivability and increased emission of hydrocarbons.

A measurement of engine acceleration has been shown to be a reliable source of information regarding combustion instability. Engine acceleration may be measured by monitoring changes in the speed of the engine, or by measuring the motion of the engine. Further, it has been shown that control systems may be constructed which continuously urge the fuel/air mixture leaner, until an indication of "over-leanness" (combustion instability) is detected at which time the mixture is urged richer. However, these systems require the mixture to be over-lean for a period of time before the mixture responds to the enrichening.

Control systems for automobile engines must be especially fast and accurate to provide the correct quantities of fuel and air at each moment in time, while the engine experiences rapid changes in throttle position, speed, and load. The ability of a control system to quickly adjust its mixture based on changes in operating conditions is characterized as overall system response. Therefore, a need exists to minimize the response time for a lean burn mixture control system.

Fuel injection has been used commercially for many years. The term "fuel injection" is used whenever the liquid fuel is forced into the engine under pressure, as opposed to aspirated into the airstream, as done by a carburetor. Fuel injection may be either mechanically or electronically controlled, and the flow of fuel may be either continuous or intermittent.

In all of these forms, it is desirable to control the air-to-fuel ratio. When all the cylinders of a multi-cylinder engine are treated as an aggregate; the control systems are designed to deliver the same air-to-fuel ratio to each of the individual cylinders. In fact, one of the chief benefits claimed for many prior art fuel injection systems is their ability to deliver nearly the identical quantity of fuel to all the cylinders.

While uniformity of fuel delivery to all cylinders is an object of most prior art systems, air delivery to each of the cylinders is not necessarily exactly uniform, and the air-to-fuel ratio requirements of each cylinder are not necessarily uniform, particularly when lean mixtures are used.

The prior art relies on a plurality of sensors to measure engine and environmental operating conditions. The control systems described in the prior art make control decisions based on sensor inputs. Each of those prior art sensors measures a time-averaged signal which is assumed to represent all the cylinders as an aggregate. Information regarding the differences between cylinders is not available from those prior art sensors. Accordingly, there is a need for control systems which consider separately the conditions in each cylinder.

Exhaust Gas Recirculation (EGR) has been used for many years for exhaust emission control purposes. One of the disadvantages of prior art EGR systems is degradation of drivability. It is well known that EGR has a tendency to spoil the combustion. EGR is known to reduce combustion temperatures, reduce the speed of flame propagation within the combustion chamber, and increase cyclic variability from one combustion event to the next. This variability of flame speed causes undesirable combustion roughness, which is perceived by the driver of the vehicle as poor drivability.

When EGR is used with prior art lean burn control systems, the degradation in drivability can be particularly offensive. Therefore, there exists the need for a lean burn control system which is compatible with EGR.

Water injection has also been known (and sometimes used) for many years for purposes of engine knock suppression and power enhancement. Prior art water injection systems have sometimes substituted alcohol or a water/alcohol mixture for water, to prevent freezing in cold weather. When water or alcohol are injected into the intake manifold in quantities roughly equal to the fuel flow rate, the principal effect is a cooling of the combustion gasses. As a result, the formation of Oxides of Nitrogen ($NO_x$) in the combustion gasses is reduced markedly, and the intake charge is cooled. Water injection has been used to increase the density of the intake charge, allowing more power to be achieved without producing excessive engine temperatures. In smaller quantities, water injection is an effective emission control technique for $NO_x$ reduction.

However, as with EGR, water injection tends to spoil the combustion and reduce the engine's tolerance for lean mixtures. Water injection is known to reduce combustion temperatures, reduce the speed of flame propagation within the combustion chamber, and increase cyclic variability from one combustion event to the next. This variability of flame speed causes undesirable combustion roughness, which is perceived by the driver of the vehicle as poor drivability. Therefore, a need exists for a lean burn control system which is compatible with water injection.

SUMMARY OF THE INVENTION

In this invention, the correction provided by the control system in response to an indication of "over-lean" combustion is very rapid. Mixture changes in the "lean" direction are made relatively smoothly, while corrections in the "rich" direction are made in rapid "jumps." This correction process is performed without any time delay for such things as subtractions, comparisons, integration, etc. The process of initiating rapid step-function mixture corrections immediately following the detection of an unstable combustion event provides a significant improvement over the prior art in overall system response.

Further, in one embodiment of this invention the control system is responsive to the conditions of individual cylinders by sensing in which cylinder the weak combustion event occurred and directing the correction to that cylinder alone by, for example, altering the duration of the electrical pulses which controls an electrically operated fuel injection valve (electronic fuel injector). Accordingly, the advantages of individual cylinder control in a lean burn control system are achieved.

Further, in this invention the lean burn control system is compatible with EGR. In the invention the EGR flow is controlled and allowed to go into the engine intake manifold. Thus, the advantages of EGR can be enjoyed in conjunction with a lean burn control system.

Additionally, in this invention the lean burn control system is further compatible with a water injection system. By controlling the amount and timing of the water injection in conjunction with the lean burn control, the present invention achieves the benefits of both leaner burns and water injection.

Therefore, it is an object of this invention to provide faster system response, so that the optimum fuel/air mixture may be supplied at all times—even through changes in operating conditions—without suffering combustion instability.

It is also a further object of the present invention to provide a lean burn control system which monitors and controls the mixture in individual cylinders.

It is another object of the present invention to provide a lean burn control system which operates in conjunction with EGR.

Also, it is yet another object of the present invention to provide a lean burn control system which also employs water injection.

FIG. 1A shows changes in the mixture over time for control systems using equal response speeds in both the rich and lean directions. As shown in FIG. 1A, the mixture resides below the Lean Combustion Boundary for a period of time. FIG. 1B shows changes in the mixture over time for the control system of the present invention. The rapid "jump" response in the rich direction minimizes the occurrences of overly-lean mixtures. Further, the fast response in the lean direction keeps the mixture near the lean combustion boundary. Thus, the present invention produces a "sawtooth" relationship for the fuel/air mixture over time. In the "sawtooth" example, the control system follows the Lean Combustion Boundary, without producing "overlean" combustion.

In U.S. Pat. Nos. 3,789,816 to Taplin; 4,099,493 to Latsch; and 4,104,990 to Frobenius, the system response is limited by the sampling technique. A portion of one engine revolution must be sampled and compared with a reference before a control decision is made. This time limitation slows down the overall system response.

In the previous Leshner patents—including U.S. Pat. Nos. 4,015,569; 4,015,572; 4,232,643; 4,368,707; and 4,827,887—a final control element (the stepper motor) receives signals from a clock with instructions to step leaner at a predetermined rate, and another instruction to step richer each time a weak combustion event is detected. For example, the abstract of U.S. Pat. No. 4,368,707 specifies:

"The clock frequency thus sets the equilibrium rate of weak combustion events, defining the optimal mixture to be supplied to the engine."

These patents teach a method of subtracting two opposing signals, and effecting a response which corresponds to the difference between these signals. This control strategy creates a mixture which is slightly over-lean much of the time, resulting in degraded drivability and hydrocarbon emissions.

The new invention allows a bias toward the rich side of the boundary of lean drivability, without dwelling excessively on the lean side of the boundary. By rapidly "jumping back" each time "over-lean" combustion is detected, the control system keeps a nominal margin from the edge of over-lean drivability. This control scheme allows the response of the servo to be increased, while minimizing the tendency for "overshooting" into the overlean region during transient operation.

The advantages of this invention over the prior art are reduced hydrocarbon emissions and improved drivability. This result is derived from the improved speed of response of the control system, made possible by faster corrections in the rich direction. This invention is particularly useful in mobile applications such as automobiles, to effect the optimum tradeoff among the following four variables:

Harmful exhaust emissions (HC, CO, $NO_x$)
Fuel consumption
Drivability (degree to which power is smooth and responsive)
Cost

BRIEF DESCRIPTION OF THE DRAWINGS

FIG. 1A is a graphic representation of the mixture versus time for control systems employing relatively equal response speeds in the rich and lean directions as shown in the prior art.

FIG. 1B is a graphic representation of the mixture versus time for the control system of the present invention.

FIG. 8A is a graphic representation of the mixture control logic contained within a fuel injection controller.

FIG. 8B is a graphic representation of the mixture control logic contained within a fuel injection controller of FIG. 7.

FIG. 8C is a graphic representation of the mixture control logic contained within a fuel injection controller of FIG. 7.

DESCRIPTION OF A PREFERRED EMBODIMENT

Figure 2:
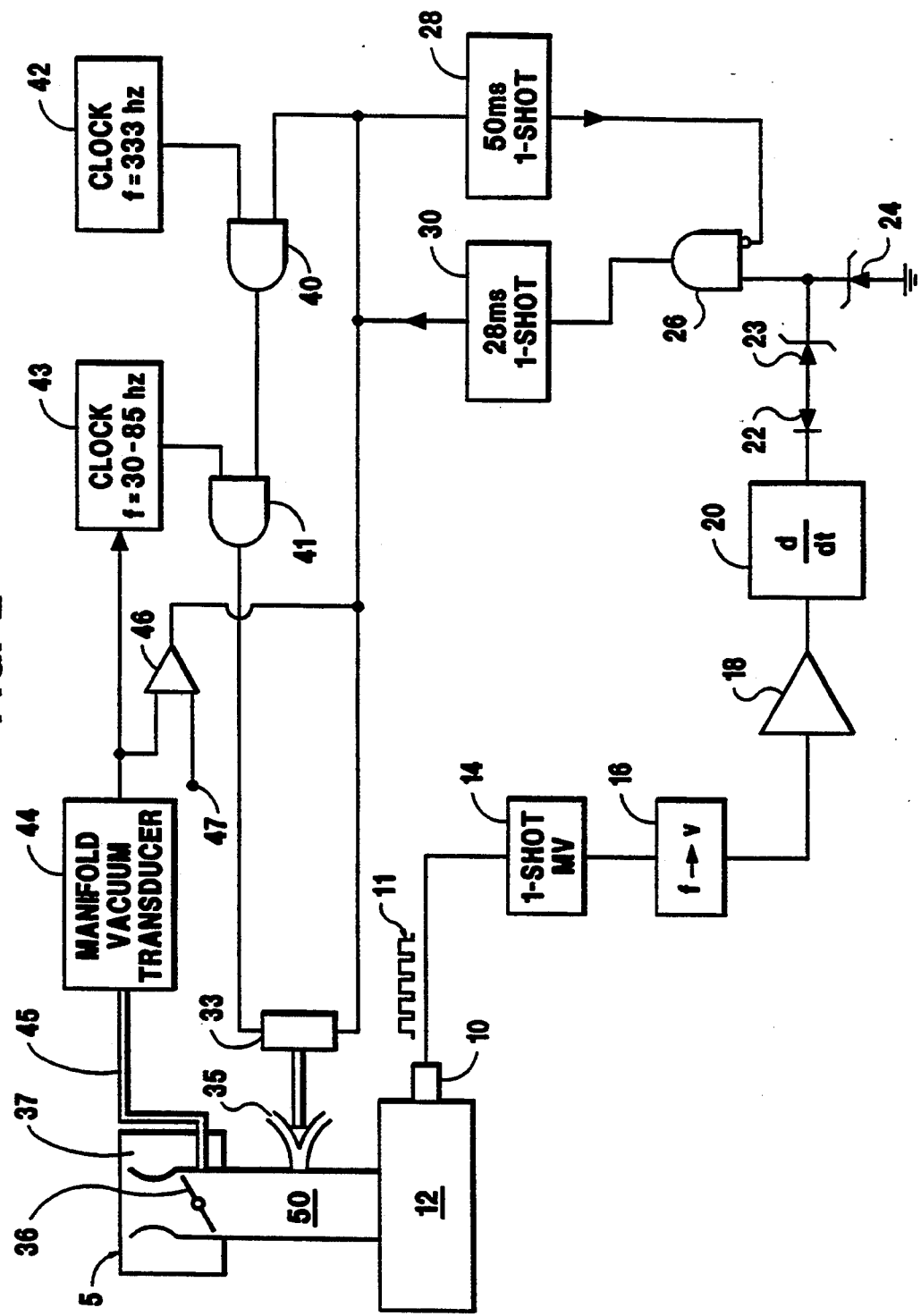
FIG. 2 is a logic diagram of the lean burn mixture control system of FIG. 1B.

FIG. 2 is a logic diagram for the lean burn control system 5 of the present invention for a conventional spark ignition internal combustion engine 12. While the engine 12 is described as a conventional spark ignition internal combustion engine, the invention is applicable to all types of internal combustion engines, including but not limited to, free-piston engines, turbines, and "Wankel" or rotary engines. Therefore, such terms as "manifold," "carburetor," "air plate," and "throttle," should be regarded as being used in the generic sense regardless of the specific form which they may take in a given application. The engine 12 includes a carburetor 37 with a throttle plate 36. An air valve 35 admits secondary or supplemental air into the engine 12 through an air-addition plate 50 between the throttle plate 36 and the engine 12. A stepping motor 33 controls the size of the opening of valve 35. Thus, the stepping motor 33 adjusts the valve 35 either to increase the ratio of fuel-to-air (i.e., move in a rich direction) or to decrease the ratio of fuel-to-air (i.e., move in a lean direction).

FIG. 2 shows a means to detect the direction and rate of change of the speed of the engine 12. A transducer 10 (in the preferred embodiment the transducer 10 is of a magnetic pick-up type or variable inductance magnetic pick-up type) is placed in close proximity to a flywheel ring gear which is fixed to the crank shaft of the engine 12 and by its placement the transducer 10 detects the passing of the flywheel gear teeth. Next to transducer 10 in FIG. 2 is a representation of the pulse train output signal 11 from transducer 10. Thus, the frequency of the pulses in pulse train 11 varies with the speed of engine 12.

The pulse train signal 11 is processed by one-shot multi-vibrator 14 and then through tachometer 16 which converts the train of pulses 11 of varying frequencies into corresponding various voltages. Thus, the voltage output of tachometer 16 varies with the speed of the engine 12.

The voltage is then amplified by an operational amplifier 18 and the resulting signal is sent to differentiating circuit 20. Accordingly, the output of circuit 20 reflects both the direction of the rate of change of speed of engine 12 (e.g., faster-to-slower, slower-to-faster or no change of speed) and the amount of speed change (e.g., the amount of acceleration or deceleration).

The signal from circuit 20 is sent to diode 22 which passes only signals from circuit 20 representing a negative rate of change in the speed of the engine 12 (i.e., the engine decelerating). The Zener diode 23, in turn, passes only negative going changes in the speed of the engine 12 which exceed a predetermined threshold, represented by the value of Zener diode 23. A clipper such as Zener diode 24 is also provided consistent with good circuitry practice.

Diode 22, Zener diode 23 and Zener diode 24 represent schematically the functions of limiting, comparing to a threshold value, and selecting electrical signals. It will be understood by those skilled in the art that those electrical functions may also be performed using a network of alternate circuit components such as comparators, amplifiers, filters and the like.

When a weak combustion event is imminent in the engine 12 because, for example, the mixture is too lean, it is desirable to detect and overcome the event by rapidly sending a richer mixture to the engine 12. Because a weak combustion event results in the engine 12 decelerating above a threshold minimum rate, the system 5 is designed to detect deceleration indicative of a weak combustion event and send a correcting signal to stepping motor 33 to overcome the event. Thus, the diode 22 and Zener diode 23 filter out signals except those signals which could indicate a weak combustion event (i.e., negative going signals above a threshold level). How the system 5 responds to the detection of a weak combustion event will be discussed next.

Signals from element 23 indicative of a weak combustion event are passed on through an AND gate 26 to a 28 millisecond one-shot multi-vibrator 30. The one-shot multi-vibrator 30 sends out a pulse of sufficient duration (e.g., 28 milliseconds) to enable stepping motor 33 sufficient time to respond to the event by creating a "richer" mixture and counteracting the weak combustion event.

At the same time, the one-shot multi-vibrator 30 also puts out a 28 millisecond pulse which is fed back into a second one-shot multi-vibrator 28 which sends out a 50 millisecond pulse. The output of the one-shot multi-vibrator 28 enters the inverting input of the AND gate 26. This "loop" (multi-vibrator 30 to multi-vibrator 28 to AND gate 26 back to multi-vibrator 30) disables one-shot multi-vibrator 30 from emitting a second pulse for at least 50 milliseconds following a first triggering of multi-vibrator 30. This ensures a minimum spacing between output pulses from one-shot multi-vibrator 30 so that—even in the case where a plurality of corrections are required—the correction pulses will have a minimum spacing of 50 milliseconds.

The reason for this spacing is that when a correction is required in the engine 12, the corrected mixture (i.e., richer mixture to overcome the event) must be drawn into the engine 12, compressed, ignited and expanded. This takes time. Accordingly, one would not expect to see the result of a given correction for approximately one or two revolutions of the engine 12, which corresponds to the 50 milliseconds inhibition of a succeeding correction. Thus, the 50 millisecond spacing provides the engine 12 sufficient time to respond to a correcting pulse from multi-vibrator 30 before another correcting pulse, if necessary, can be generated. This minimizes the chance for overshooting or overcorrection by system 5. Other time durations may be used, but for the preferred embodiment the time pulses are 28 and 50 milliseconds for vibrators 30 and 28, respectively.

The 28 millisecond correction performs two other functions: It reverses the direction of the stepping motor 33 so that the motor 33 travels in the direction which enriches the mixture (i.e., closes the valve 35) and it changes the stepping frequency (or rate) to a much higher frequency predetermined by clock 42 so that during the 28 millisecond pulse there are a rapid number of steps in the rich direction to overcome the event. The system 5 has a fixed frequency oscillator clock 42 with a preferred frequency of 333 hertz. The frequency of clock 42 determines the number of steps taken in the rich direction during the 28 millisecond correction period. The 333 hertz frequency equates to 3 milliseconds between pulses. Thus, each correction totals 10 steps in the rich direction in the preferred embodiment.

Figure 4:
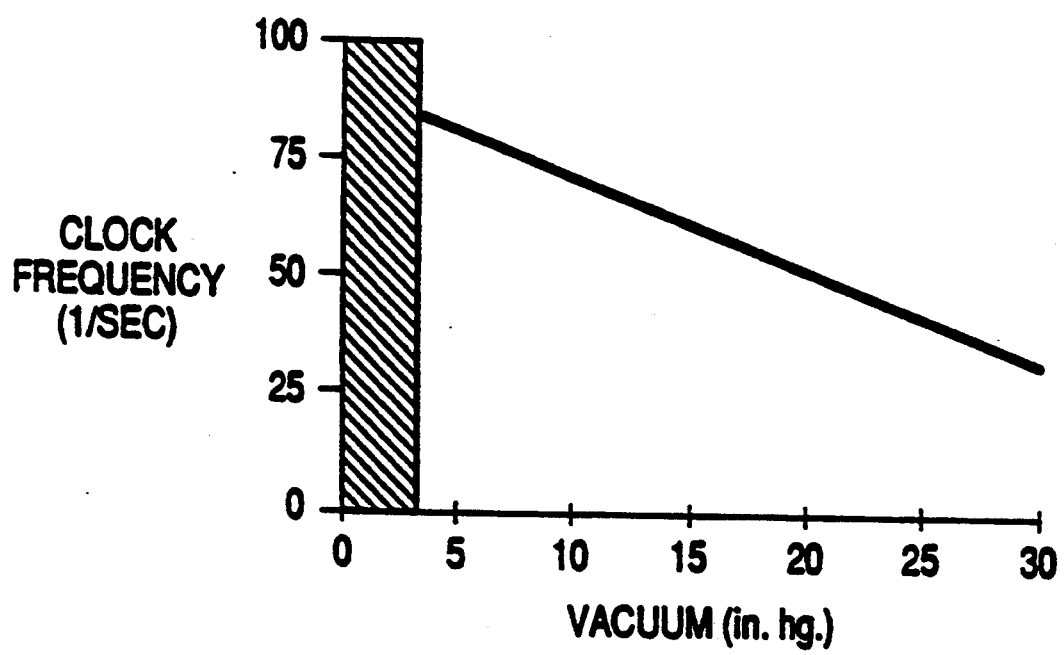
FIG. 4 is a graphic representation of the frequency of the variable clock versus the vacuum level in the manifold of the system of FIG. 1B.

System 5 automatically varies the rate at which the mixture is forced lean during "nominal" operation (i.e., when no weak combustion event has been detected) in order to maximize responsiveness and minimize pollutants at various performance levels, as discussed more fully below. Vacuum level signal 45 is generated by the engine 12 and reflects the power requirements of the engine 12 in a generally inverse relation. For example, at high power levels the vacuum pressure is low. The intake manifold vacuum transducer 44 receives a vacuum signal 45 from the engine 12 and outputs a signal which controls the frequency of the clock 43. Variable frequency oscillator clock 43 has a preferred frequency range of between 30 to 85 hertz. Changes to the frequency of clock 43 are accomplished by feeding the voltage output of transducer 44 into the frequency determining input of clock 43. For example, as shown in FIG. 4, relatively high levels of intake manifold vacuum would cause the clock 43 to run at about 30 hertz, while relatively low manifold vacuum levels would cause the frequency to vary up to approximately 85 hertz. The frequency of clock 43 determines the rate at which the stepping motor 33 will go lean when the system 5 is in its nominal state. The higher the frequency of clock 43, the faster the stepping motor 33 steps and the faster the mixture goes lean. The frequency range of 30 to 85 hertz is by way of example and other ranges may be used. Thus, the system 5 automatically matches the frequency of clock 43 to the power requirements of the engine 12—based upon the level of manifold vacuum 45—to maximize the performance of the engine 12 as discussed below.

The output of clocks 42 and 43 are sent to AND gates 40 and 41, respectively. The AND gates 40 and 41 combine signals. The two signals that feed AND gate 40 are the 28 millisecond signal representing a weak combustion event and the clock 42 frequency of 333 hertz. Thus, the output of AND gate 41 is a composite signal which is used to command the final control element stepping motor 33 to take a step. Specifically, whenever there is a pulse at the output of AND gate 41, the stepping motor 33 takes one step.

In summary, the engine 12 has a carburetor 37. Secondary air enters carburetor 37 through valve 35 which is controlled by final control element stepping motor 33. In the absence of any detection of weak or unstable combustion, stepping motor 33 is commanded to open the valve 35 in a lean direction at a rate set by clock 43 and dependent upon the manifold vacuum pressure (e.g., a frequency of 30 to 85 hertz). Upon the detection of a weak combustion event, the final control element stepping motor 33 is commanded to reverse direction and make a correction in the rich direction by closing valve 35 for a predetermined time period (e.g., 28 milliseconds) at a predetermined frequency step rate, determined by clock 42 (e.g., a frequency of about 333 hertz) resulting in a predetermined number of "rich" steps (e.g., 10 steps).

FIGS. 3A-E are shown in phase relationship to one another. Dashed line A in FIGS. 3A-E reflects the point of time at which system 5 detects a weak combustion event. Dashed line B in FIGS. 3A-E reflects the end of the correction time period (e.g., 28 milliseconds after dashed line A).

Figure 3:
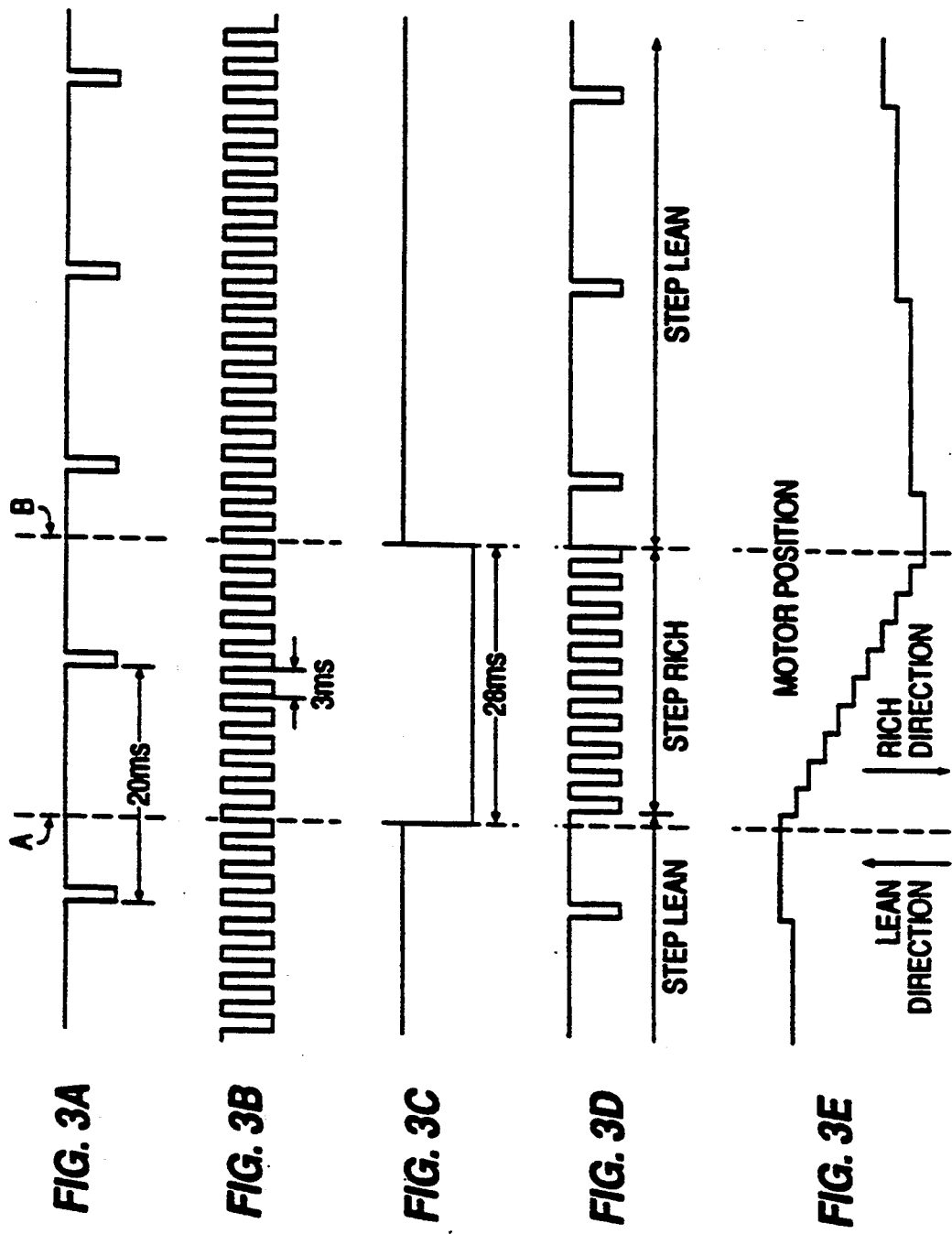
FIG. 3A is a graphic representation of the output of the variable clock of the system of FIG. 1B.
FIG. 3B is a graphic representation of the output of the fixed frequency clock of the system of FIG. 1B.
FIG. 3C is a graphic representation of the output of the first one-shot multi-vibrator of the system of FIG. 1B.
FIG. 3D is a graphic representation of the output of an AND gate of the system of FIG. 1B.
FIG. 3E is a graphic representation of the position of the stepping motor of the system of FIG. 1B.

FIG. 3A represents the output from the clock 43. Although the output of the clock 43 is variable, in this example FIG. 3A shows a nominal output frequency of 50 hertz resulting in approximately 20 milliseconds of spacing between the "go lean" pulses. Thus, in its nominal condition in this example the stepping motor 33 makes one step in the lean direction every 20 milliseconds when there is no correction being commanded by the system 5.

FIG. 3B represents the output of the fixed frequency clock 42 which, in the preferred embodiment, is 333 hertz resulting in approximately 3 milliseconds of spacing between the "go rich" pulses.

FIG. 3C represents the output signal of the first one-shot multi-vibrator 30. When the signal is high, the system 5 has not detected the existence of a weak combustion. When a weak combustion event is detected by the system 5, the signal from multi-vibrator 30 goes low for a period of 28 milliseconds.

FIG. 3D shows the shape of the signal at the output of AND gate 41 which represents the composite signal of AND gate 40 and multi-vibrator 30 and is the control signal sent to the stepping motor 33.

FIGS. 3A-D show that in the absence of a correction (i.e., while FIG. 3C is in its high state), pulses from the clock 43 go to the motor 33 and the motor steps in the lean direction at the frequency of 50 hertz. Once a weak combustion event is detected, a 28 millisecond correction is initiated. During the 28 millisecond correction (shown in FIG. 3C) the direction of the steps of the stepping motor 33 is reversed from go lean to go rich and the frequency of the steps of the stepping motor 33 is increased as determined by the frequency of fixed clock 42 (e.g., 333 hertz which equals one go rich step every 3 milliseconds) for the duration of the 28 millisecond correction.

After the 28 millisecond correction is completed, the stepping rate and direction of the motor 33 reverts back to a rate of one go lean step every 20 milliseconds, as shown in FIG. 3A. Thus, as shown in FIG. 3D, during the period before the correction is initiated (i.e., to the left of dashed line A), the motor 33 is travelling in a lean direction (i.e., opening the valve 35) and a frequency of 50 hertz. During the correction (i.e., between dashed lines A and B), the motor 33 is traveling more rapidly in the rich direction (i.e., closing the valve 35) at a frequency of 333 hertz. After the 28 millisecond correction has elapsed (i.e., to the right of line B), the motor 33 is travelling forward again opening the valve 35 and causing the mixture to become leaner again at the rate of 50 hertz.

FIG. 3E shows the position of motor 33 in time relationship with FIGS. 3A–D. As the first pulse in FIG. 3D occurs it effects one step in the lean direction and the position of motor 33 moves one step in the lean direction (i.e., up the page). During the 28 millisecond correction, the motor 33 steps in the rich direction (i.e., down the page) at a more rapid rate and, in this example, takes 10 steps in the rich direction during the 28 millisecond correction. Following that correction, the system 5 detects no additional weak combustion events and the motor 33 takes three steps in the lean direction, at the rate of one step every 20 milliseconds. Thus, FIG. 3E shows the motor 33 going lean, taking 10 quick steps rich and then going lean again. FIG. 3E illustrates two different rates of travel depending on whether the motor 33 is effecting a leaning or enrichening of the fuel/air mixture.

As noted above, the frequency output of clock 43 is controlled by the intake manifold vacuum 45 to improve engine performance. FIG. 4 shows the relationship between the signal from the vacuum transducer 45 and the frequency of clock 43. At very low levels of vacuum (in this example, 0–3 inches of mercury) the power requirements on the engine 12 are very high and the throttle is nearly fully open (shown as the shaded region in FIG. 4). Under these conditions it is neither desirable nor advantageous to use a lean mixture. During these very low vacuum levels, the valve 35 is caused to stay closed. Specifically, the output voltage of transducer 44 is connected to one input of comparator 46. Reference voltage 47 equals the voltage output from transducer 44 when the vacuum pressure level 45 is 3 inches of mercury and is connected to the second input of comparator 46. The output of comparator 46 is connected to the output of multi-vibrator 30 and is able to override multi-vibrator 30. Thus, at low values of manifold vacuum (e.g., between 0 and 3 inches of mercury), multi-vibrator 30 is overridden, and the stepping motor 33 is caused to run continuously at 333 hertz in the reverse direction, keeping valve 35 closed.

At power levels equaling vacuum levels in the 5–10 inches of mercury range, the throttle is substantially open—but not fully open—and under these conditions the mixture is optimally quite lean for the purposes of emission control and fuel economy. As shown in FIG. 4, the relationship between the frequency of clock 43 and vacuum 45 changes in a substantially linear fashion between about 5 inches and about 25 inches of mercury.

At approximately 20 inches of mercury, the engine 12 is experiencing a very low power condition and the throttle is substantially closed. Under such conditions even slight irregularities in the combustion would be easier to detect and, accordingly, a very lean mixture is undesirable. Thus, in this range, for reasons of improved drivability, the frequency of clock 43 is biased lower at high vacuum levels which, in turn, biases the fuel/air ratio richer in the region of 15–20 inches of mercury, as compared to the ratio of the mixture for the 5–10 inches range. The vacuum levels specified are by way of example only and other levels may be used.

In summary, it is generally desirable to bias the control system richer or leaner, dependent on the intake manifold vacuum 45 in the engine 12 for the purpose of improving drivability and reducing exhaust emissions. When the throttle is fully open, the driver needs full power and a lean mixture is undesirable. In this example, when the vacuum is between 0–3 inches of mercury, the leaning function is disabled entirely. In the high-power regions where the throttle is not fully open—for example, the region of 5–10 inches of mercury manifold vacuum—the leanest mixture that is consistent with smooth engine operation is desirable. In the region of 15–20 inches of mercury which represents very low power levels—the mixture should be biased slightly richer because under these conditions the driver may be able to detect weak combustion or unstable combustion more easily than at higher power levels. Thus, in the range of 3–25 inches of mercury manifold vacuum, the system biases the mixture slightly richer or leaner by changing the frequency of clock 43. This change in clock frequency 43 has the effect of tailoring the fuel-to-air mixture to the power level of the engine 12 and effects a better tradeoff between exhaust emissions and drivability.

Figure 5:
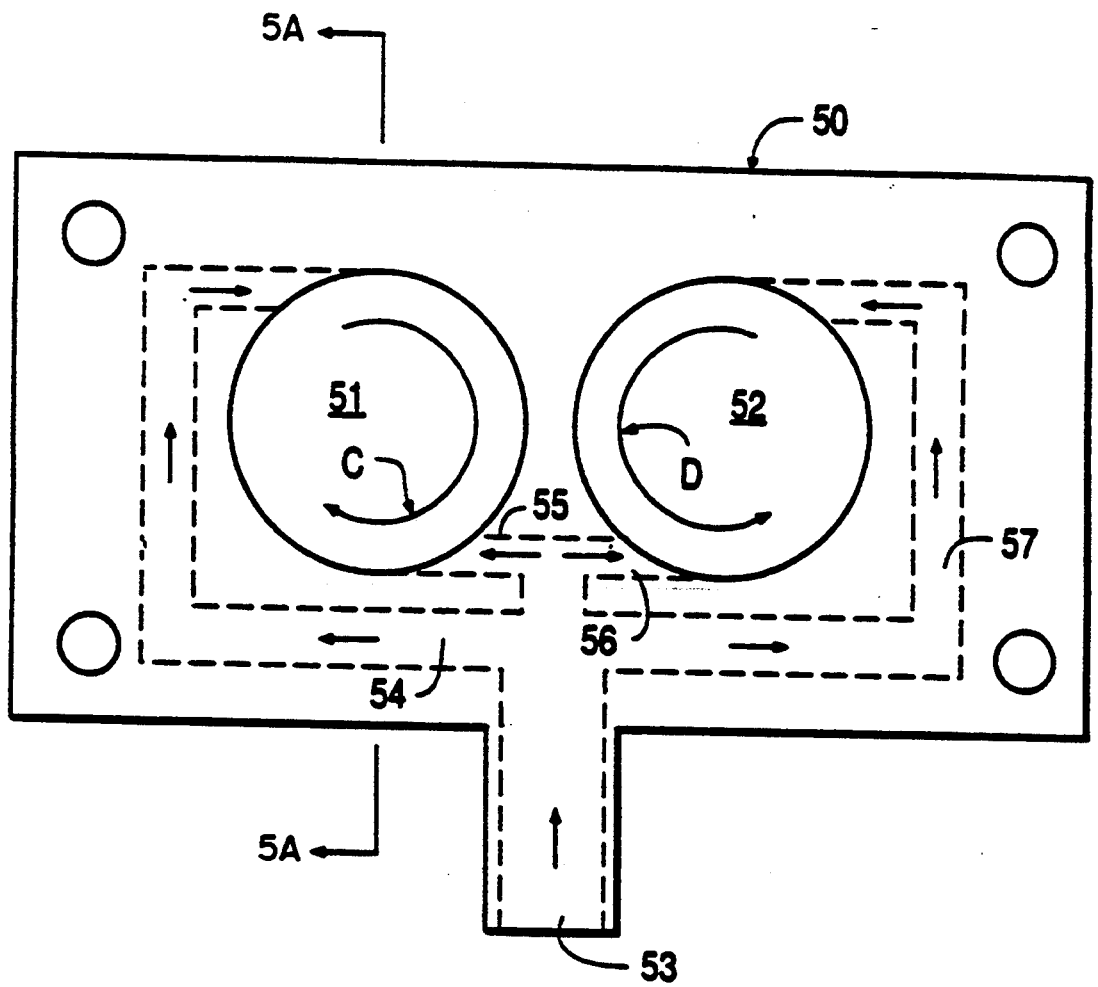
FIG. 5 is a top view of the air-addition plate of the system of FIG. 1B.

FIG. 5 shows the air-addition plate 50 which is mounted between the carburetor and the intake manifold of the engine 12 for the purpose of admitting secondary (e.g., supplementary) air into the engine 12 to effect a leaner fuel-to-air mixture. The primary fuel/air mixture passes from the intake manifold through cylindrical main passageways 51 and 52. Secondary air enters the plate 50 through entrance passageway 53. The secondary air is then channeled to the passageways 51 and 52 through four secondary passageways 54, 55, 56 and 57 shown in phantom line in FIG. 5.

The secondary passageways 54, 55, 56 and 57 are constructed to produce a swirl in the main passageways 51 and 52. More specifically, secondary air passages 54 and 55 connect with cylindrical main passageway 51 tangential to the axis of cylindrical passageway 51. Thus, secondary air entering passageway 51 from secondary passageways 54 and 55 will tend to swirl with the primary fuel/air mixture in passageway 51. This swirl will be in a generally clockwise direction in passageway 51 as shown by arrow C.

Similarly, secondary passageways 56 and 57 impart a counterclockwise swirl to the primary fuel/air mixture in main passageway 52.

Figure 5A:
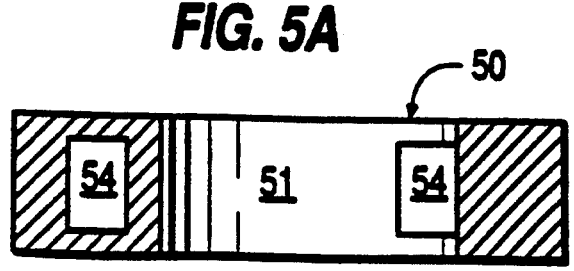
FIG. 5A—A is a cross section of the air-addition plate of FIG. 5 taken along line A—A.

FIG. 5A—A shows, in cross-section, the construction of plate 50. The entry of secondary passageway 54 to main passageway 51 is shown in FIG. 5A—A. The use of four secondary passageways is by way of example only and greater or fewer passageways may be used.

The benefit of introducing the secondary flows tangential to the primary flow is to maximize the mixture of secondary air from passageways 54, 55, 56 and 57 with the primary mixtures in passageways 51 and 52. Thus, by maximizing the mixtures of the primary and secondary flows, the overall responsiveness of system 5 is improved.

Figure 6:
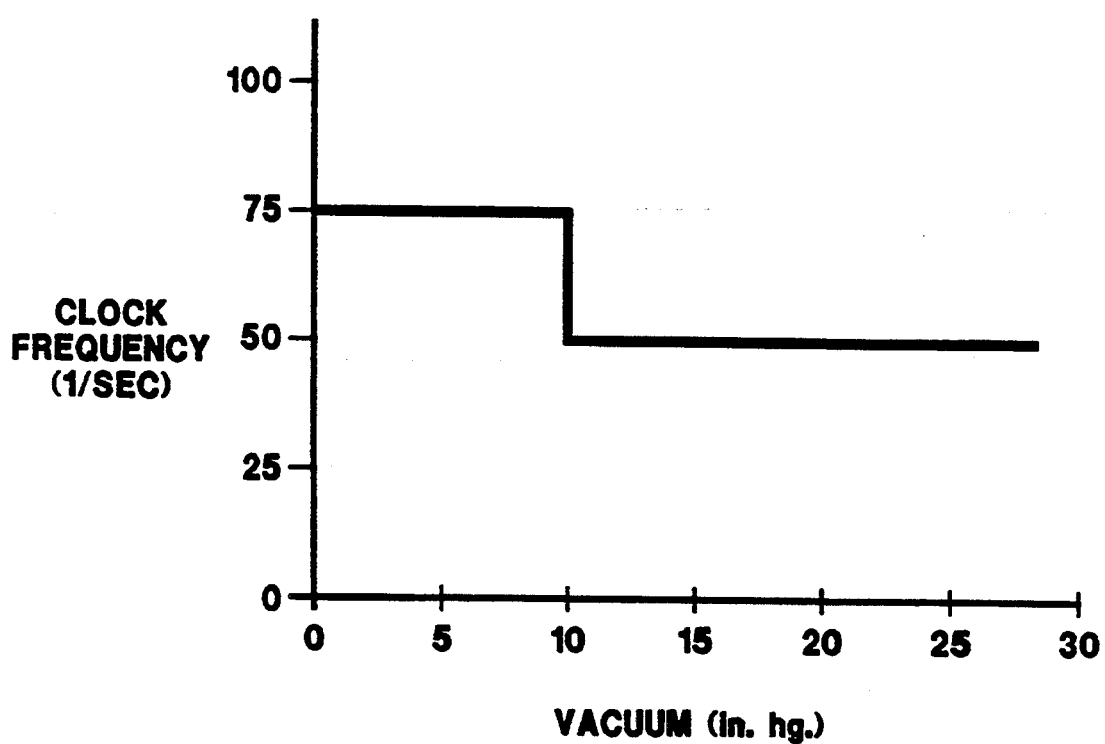
FIG. 6 is a graphic representation of the two frequencies of the clock versus the vacuum level in the manifold of an alternate embodiment of the system of FIG. 1B.

Alternatively, the variable frequency clock 43 could be replaced by a clock with only two outputs based upon vacuum input. Specifically, FIG. 6 illustrates the relationship between engine manifold vacuum and the frequency of a clock with only two outputs based upon vacuum input. At vacuum levels below a pre-set value (10 in. hg. for this example), the clock outputs a fixed frequency of 75 hertz. At vacuum levels above the same pre-set value, the clock outputs a fixed frequency of 50 hertz. It should be understood that this arrangement contains three preset values; two frequencies and one vacuum level, which may be selected to suit a particular engine. In a preferred embodiment, the two preset frequencies fall within the range of 30–85 hz depending on the particular engine.

The purpose of selecting two different clock frequencies is to provide more aggressive or less aggressive enleanment of the mixture, depending on whether the engine is being operated at high or low power levels. An arrangement with more than two preset clock frequencies and corresponding vacuum levels could also be used. The modified clock having preset frequencies, as represented by FIG. 6, can be used with any of the lean burn control systems of the present invention.

Figure 7:
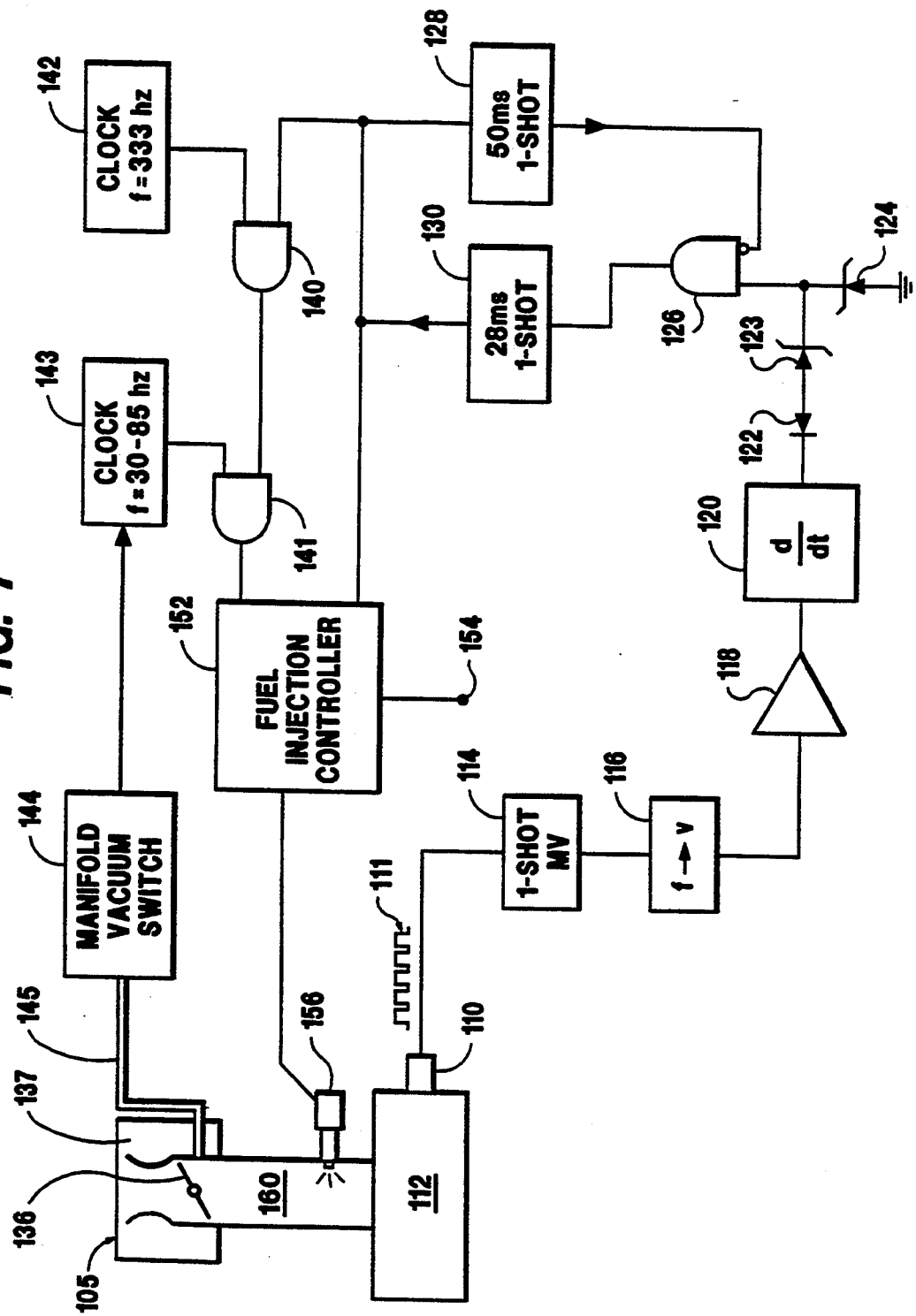
FIG. 7 is a logic diagram of an alternate lean burn mixture control system of the present invention for a single-point fuel injected engine.

Referring to FIG. 7, another embodiment of the present invention is shown for providing lean mixture control in an engine using a single-point fuel injection system. In this embodiment, it can be seen that the sensing of engine crankshaft acceleration and detection of combustion instability are exactly as described in the embodiment shown in FIG. 2 (corresponding reference numerals have been incremented by 100). FIG. 7 illustrates schematically how the mixture control function is applied to a single-point fuel injection system.

As in the carburetor application, one-shot multi-vibrator 130 outputs a pulse of fixed duration (e.g. 28 milliseconds), indicating that a mixture correction (enrichment) is required. This signal is fed into fuel injection controller 152. Also fed into fuel injection controller 152 is the output of AND gate 141, representing a clock frequency commanding the rate of change of mixture. The clock 143 may be either a variable frequency clock, as represented by FIG. 4, or a clock with preset frequencies and vacuum level, as represented by FIG. 6. As in the first embodiment, changes in the lean direction are made more slowly and gradually than corrections in the rich direction.

The mixture control logic contained inside the fuel injection controller 152 is illustrated in FIG. 8. FIG. 8a represents a basic fuel injector pulse 210, as it would be in the absence of any lean mixture controller. FIG. 8b represents a delay pulse 212, the duration of which is proportional to the required enleanment of the mixture. Pulses 210 and 212 are processed digitally such that the onset of a pulse 214 supplied to the fuel injector 156 is delayed by the duration of delay pulse 212. FIG. 8c represents the duration of the injector adjusted pulse 214.

Each time a pulse from AND gate 141 occurs, the duration of injector delay pulse 212 is incremented or decremented. Each time a pulse from the one-shot multi-vibrator 130 occurs, the duration of injector delay pulse 212 is decremented 10 units. In the absence of a pulse from the one-shot multi-vibrator 130, each pulse from AND gate 141 causes delay pulse 212 to increment one unit. For the purpose of illustration, injector pulse width 210 is 5 milliseconds, injector delay pulse 212 varies between zero and 2 milliseconds, and one unit of increment or decrement for injector delay pulse 212 is 10 microseconds.

In the absence of any pulses from the one-shot multi-vibrator 130, each pulse output from AND gate 141 causes injector delay pulse 212 to increment 10 microseconds in duration. As a result, injector adjusted pulse 214 becomes shorter and shorter, which causes the mixture to become leaner and leaner. As soon as a pulse is output from the one-shot multi-vibrator 130, indicating the need for a mixture correction (enrichment), the duration of the injector delay pulse 212 is decremented 10 units, or 100 microseconds, causing injector adjusted pulse 214 to become longer, which causes the mixture to become richer.

Referring to FIG. 9, the sequential firing of a four cylinder engine is illustrated. FIG. 9a represents sequential periods in time during which the power-producing stroke of each individual cylinder occurs. The sequence is according to the firing order of the cylinders and in this example the firing order is cylinder Nos. 1, 4, 3, 2, 1, 4, 3, 2, etc.

In a multicylinder reciprocating internal combustion engine, each cylinder typically produces the bulk of its power over a crankshaft rotational angle of about 90 degrees. Therefore, even in an eight cylinder engine, the power-producing periods for each cylinder fall into discrete, non-overlapping windows in time.

Figure 9A:
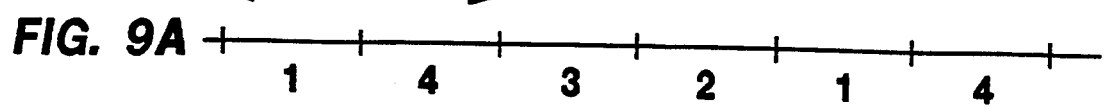
FIG. 9A is a graphic representation of the control logic for an alternate lean burn mixture control system of the present invention showing the four cylinder firing sequence.
Figure 9B:
FIG. 9B is a graphic representation of the control logic of the present invention showing the windows during which cylinder #1 produces power.
Figure 9C:
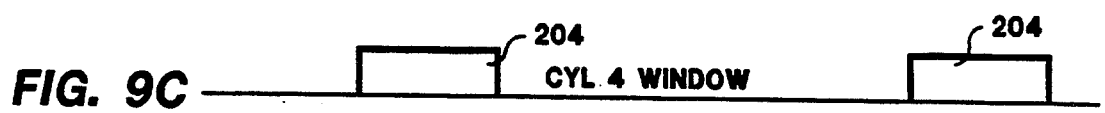
FIG. 9C is a graphic representation of the control logic of the present invention showing the windows during which cylinder #4 produces power.
Figure 9D:
FIG. 9D is a graphic representation of the control logic of the present invention showing the windows during which cylinder 3 produces power.
Figure 9E:
FIG. 9E is a graphic representation of the control logic of the present invention showing the windows during which cylinder 2 produces power.

FIG. 9b illustrates the windows 201 during which cylinder #1 produces power. FIG. 9c illustrates the windows 204 during which cylinder #4 produces power. FIG. 9d illustrates the windows 203 during which cylinder #3 produces power. FIG. 9e illustrates the windows 202 during which cylinder #2 produces power. For the four cylinder four-stroke engine of this illustration, the time duration of one entire engine revolution corresponds to the duration of two consecutive windows.

Figure 10:
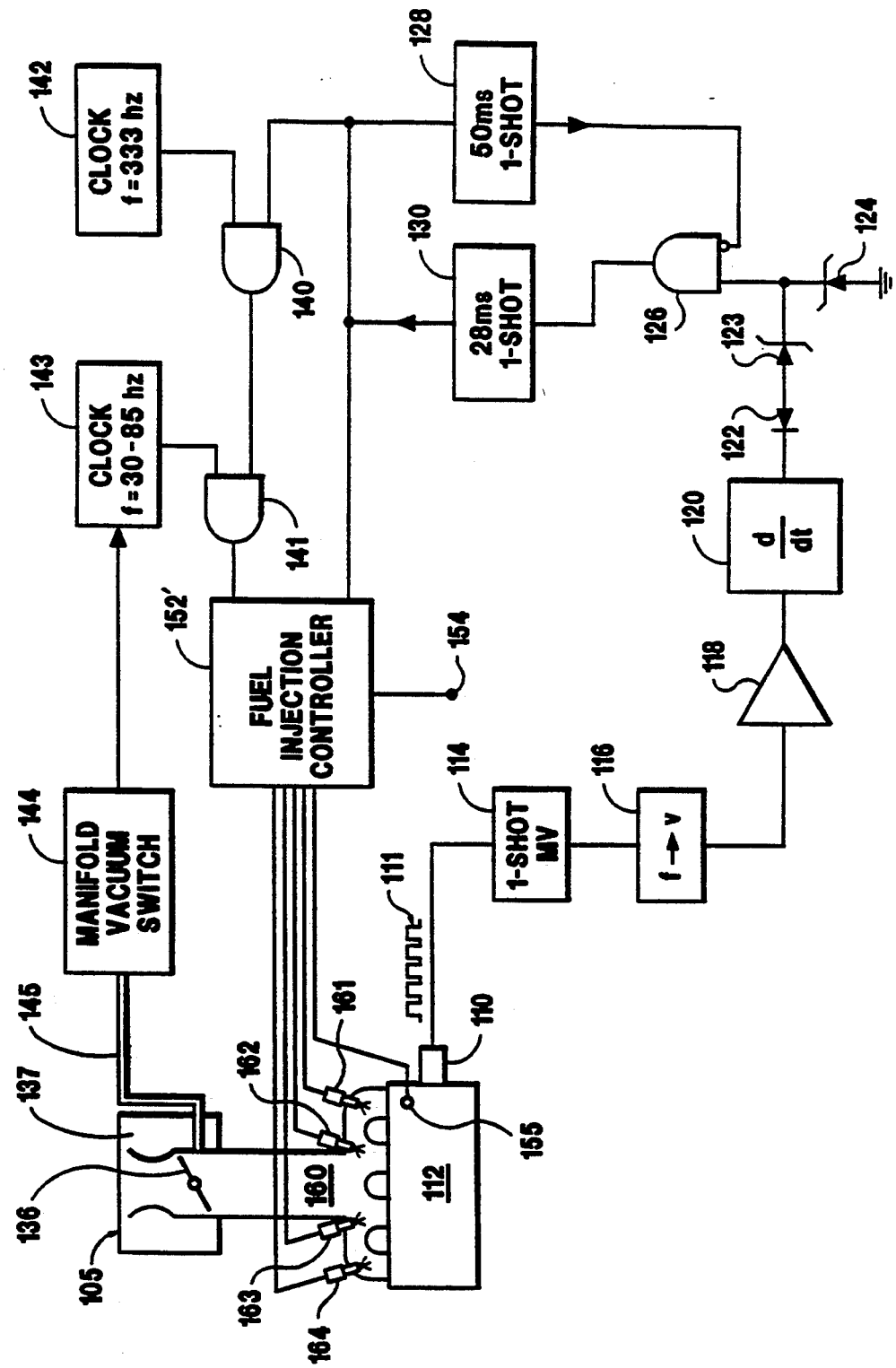
FIG. 10 is logic diagram of the control system of FIG. 9.

FIG. 10 illustrates a control system for individual cylinder mixture control in a four cylinder engine. It is well known that individual cylinders of an engine usually do not operate at exactly the same air-to-fuel mixture, and that even if they did, each cylinder has its own unique tolerance for lean mixtures due to differences in temperature, ignition energy, turbulence level of the charge, degree of combustion chamber deposits, etc. Thus, by identifying a particular cylinder in which a weak combustion event occurs, preferably an individual correction can be made to that cylinder alone to improve performance.

In this embodiment, a fuel injection controller 152' receives inputs from the one-shot multi-vibrator 130 and the AND gate 141. Another input to fuel injection controller 152' is engine position sensor 155. The position sensor 155 may be derived from any engine event which occurs regularly at a discrete position of the camshaft. For example, the timing of a specific spark plug firing or a specific fuel injector opening would satisfy the input requirements for the sensor 155. The sensor 155 is used by the fuel injection controller 152' to determine which cylinder is producing power at any given time. Using the reference pulse from the sensor 155, the fuel injection controller 152' generates the windows illustrated in FIG. 9.

Figure 11:
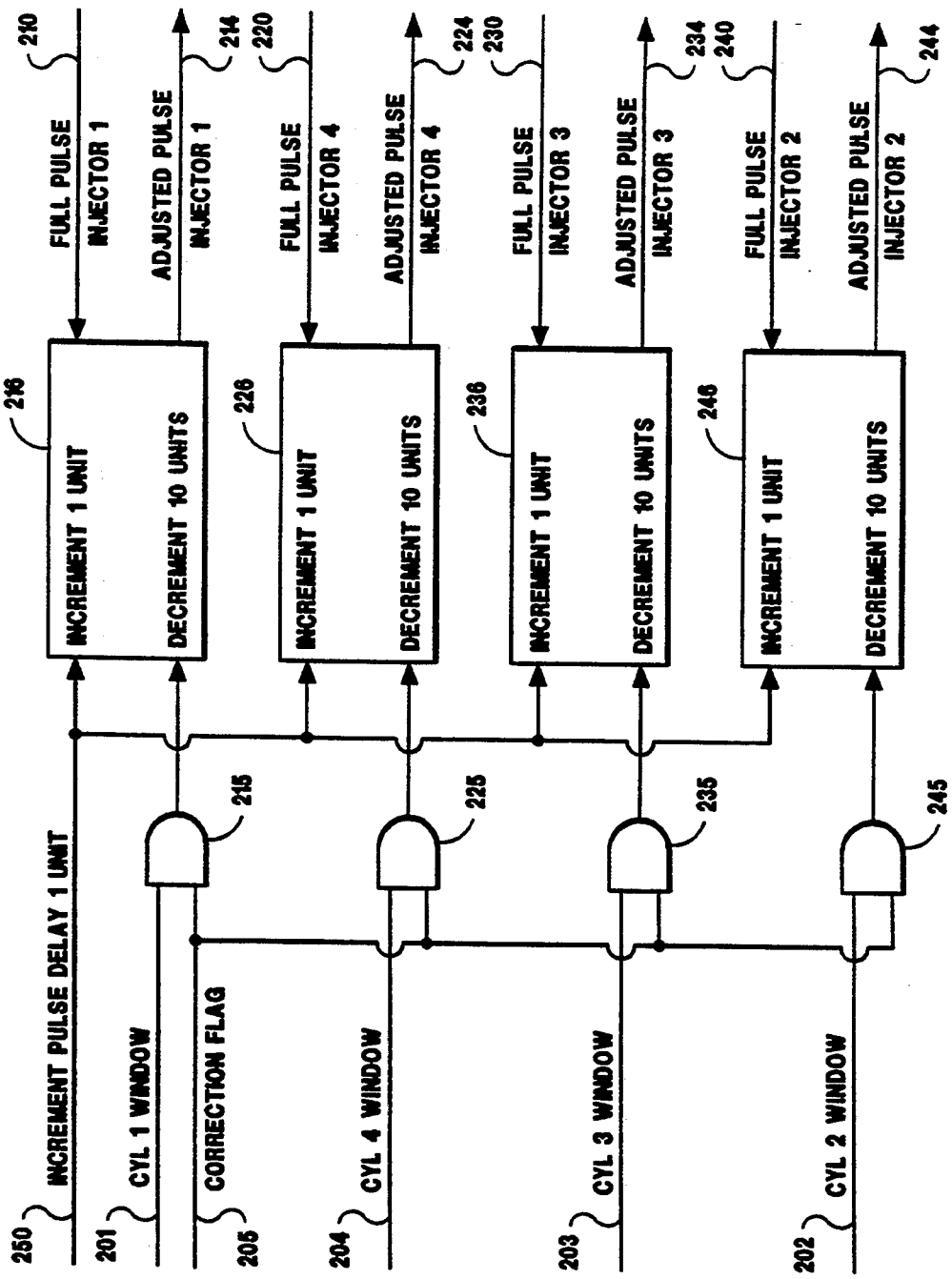
FIG. 11 is a logic diagram of the injector pulse logic inside the fuel injection controller of FIG. 10.

There are multiple outputs from the fuel injection controller 152' each having their own unique pulse durations for driving fuel injectors 161, 162, 163 and 164. FIG. 11 illustrates schematically the injector pulse logic inside the fuel injection controller 152'. Four independent channels produce logic pulses which control the durations of the individual fuel injectors 161, 162, 163 and 164.

The windows 201, 202, 203 and 204 of FIG. 9 are each fed to one input of AND gates 215, 225, 235 and 245, respectively. The other inputs of AND gates 215, 225, 235 and 245 are connected to a correction flag pulse 205, which is output from the one-shot multivibrator 130. Thus, each time a mixture correction is required, this array of gates determines which cylinder to correct. Accordingly, each correction flag pulse 205 is directed to only one of the individual injector pulse controllers 216, 226, 236 or 246. In turn, only the controller requiring correction alone receives inputs which cause the injection pulse of that controller alone to increment or decrement, as described for the fuel injection controller 152 of FIG. 7.

The result of the individual cylinder controllers 216, 226, 236 and 246 incrementing and decrementing based on the presence or absence of weak combustion events detected for the individual cylinders is a unique pulse duration supplied to each individual cylinder. Thus, each cylinder is controlled to its own individual lean limit. In this way, pulse durations to each fuel injector are modified by the controller on a cylinder-by-cylinder basis. Furthermore, this embodiment may be implemented without any moving parts.

Figure 12:
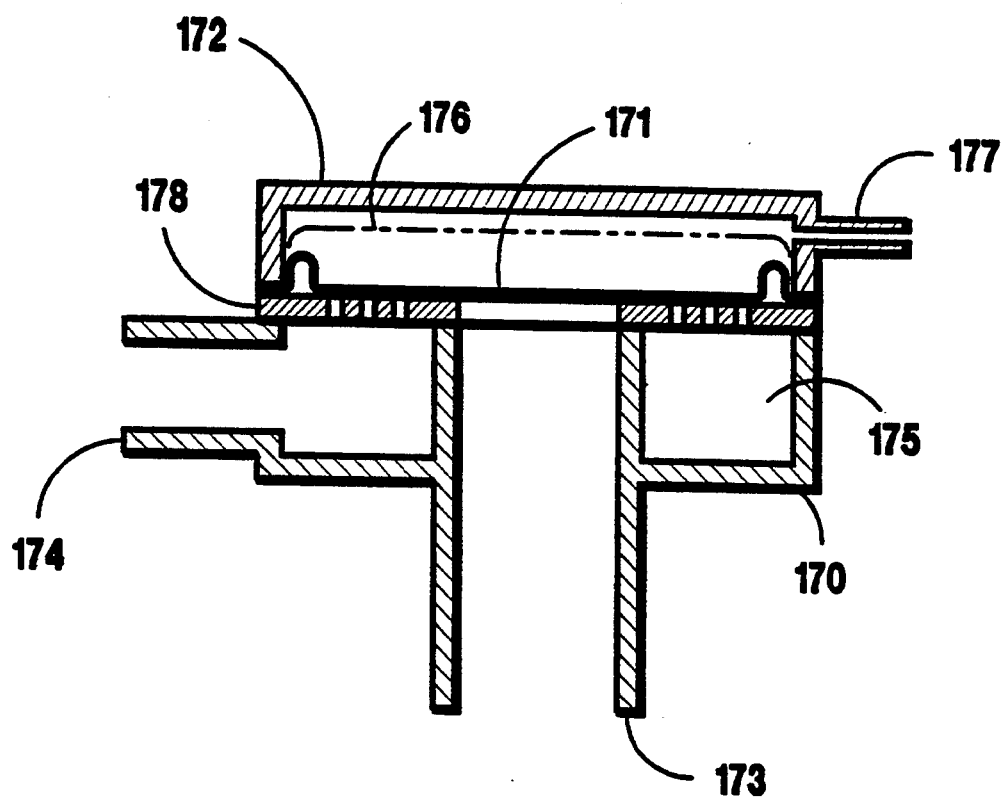
FIG. 12 is a sectional view of an air valve of the present invention.
Figure 13:
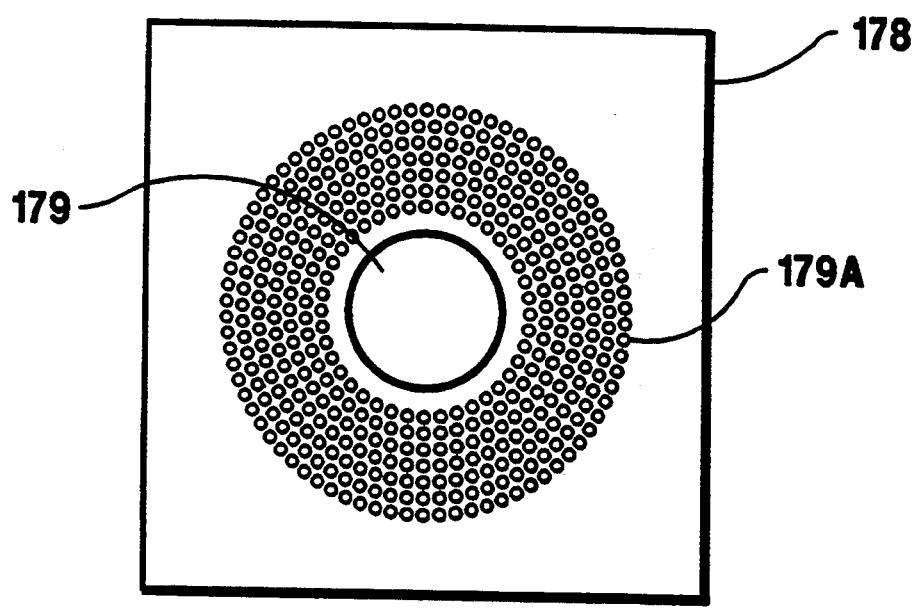
FIG. 13 is a top view of the baffle of the air valve in FIG. 12.
Figure 14:
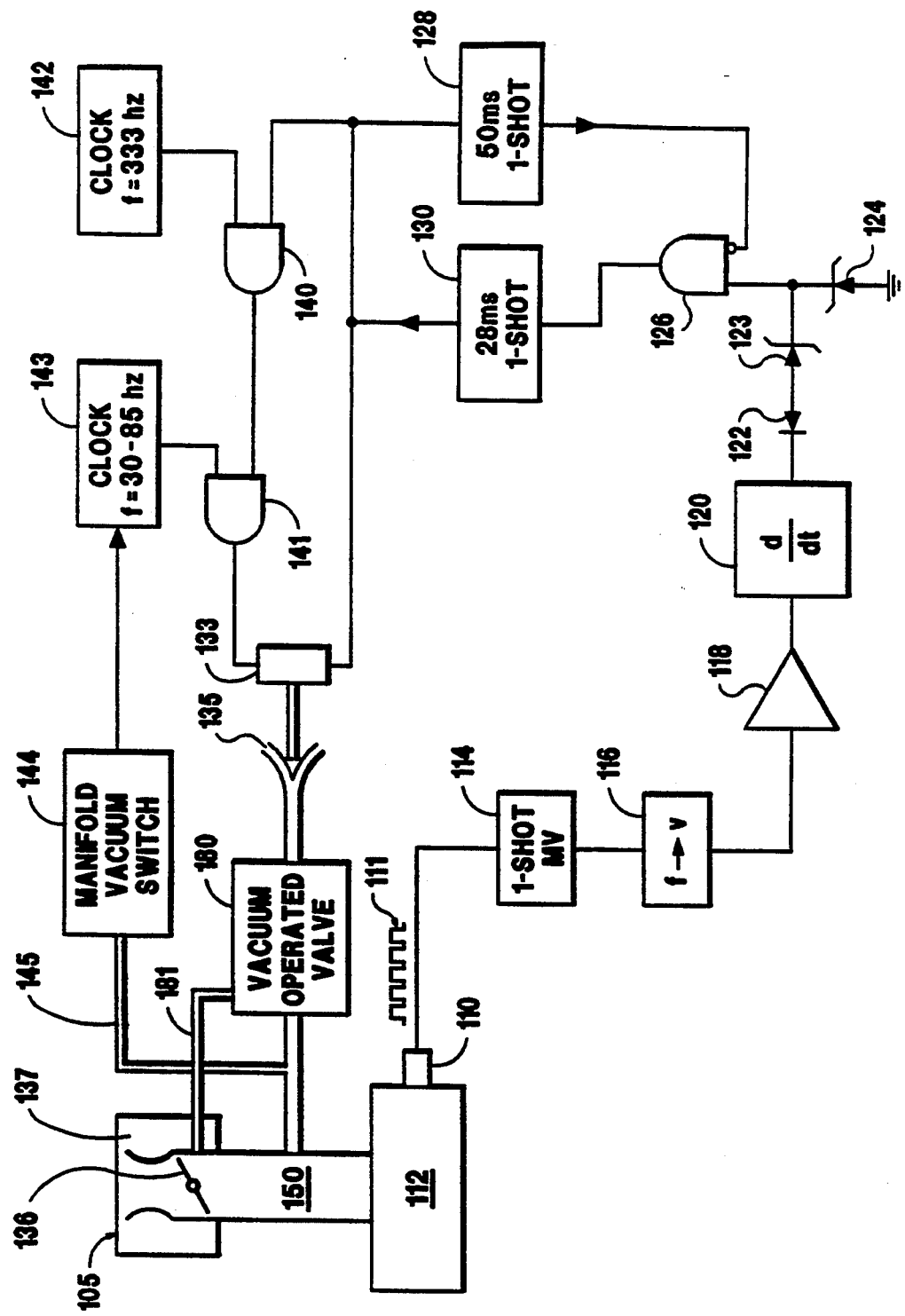
FIG. 14 is a logic diagram of the lean burn mixture control system using the valve of FIG. 12.

FIGS. 12–14 show a further embodiment of the mixture control system of the present invention using a vacuum operated air valve 180. FIG. 12 shows representative details of construction for the air valve 180. The air valve 180 includes a ported vacuum inlet 177, a diaphragm 171 and a perforated baffle 178. When there is no vacuum signal through line 181 present at the ported vacuum inlet 177, the diaphragm 171 lays flat against the perforated baffle 178. In this condition, air is blocked from flowing from a fresh air inlet 173 to the engine vacuum connection 174. When a vacuum signal appears at ported vacuum inlet 177, the diaphragm 171 is pulled away from the perforated baffle 178, allowing air to flow from fresh air inlet 173 through the perforated baffle 178 to the engine vacuum connection 174.

A plan view of perforated baffle 178 is shown in FIG. 13. The large central hole 179 communicates with fresh air inlet 173, and the multiple smaller perforations 179a of the perforated baffle 178 communicate with the engine vacuum connection 174 leading to the air addition plate 150.

FIG. 14 illustrates the function of the vacuum operated valve 180. Valve 180 is connected in series with valve 135 in such a way that both valves must be opened for the control system to perform any enleanment of the mixture. The vacuum operated valve 180 will remain open as long as the vacuum level at the inlet to line 181 is maintained above a certain level. However, when the vacuum level at the inlet to line 181 is very low, the valve 180 will be closed, thereby preventing any enleanment which would otherwise be created by the introduction of additional air through the valve 135.

The inlet to line 181 is located at a position which is above throttle plate 136 when the throttle is fully closed and below throttle plate 136 when the throttle is opened beyond idle. Therefore, the vacuum level in line 181 is very low both when the throttle is fully closed and when it is fully open. During operation, the valve 180 functions to disable the leaning function immediately whenever the throttle is fully closed or fully open. The valve 180 also provides a "limp-home" capability if the valve 135 should ever fail in the open position.

Figure 15:
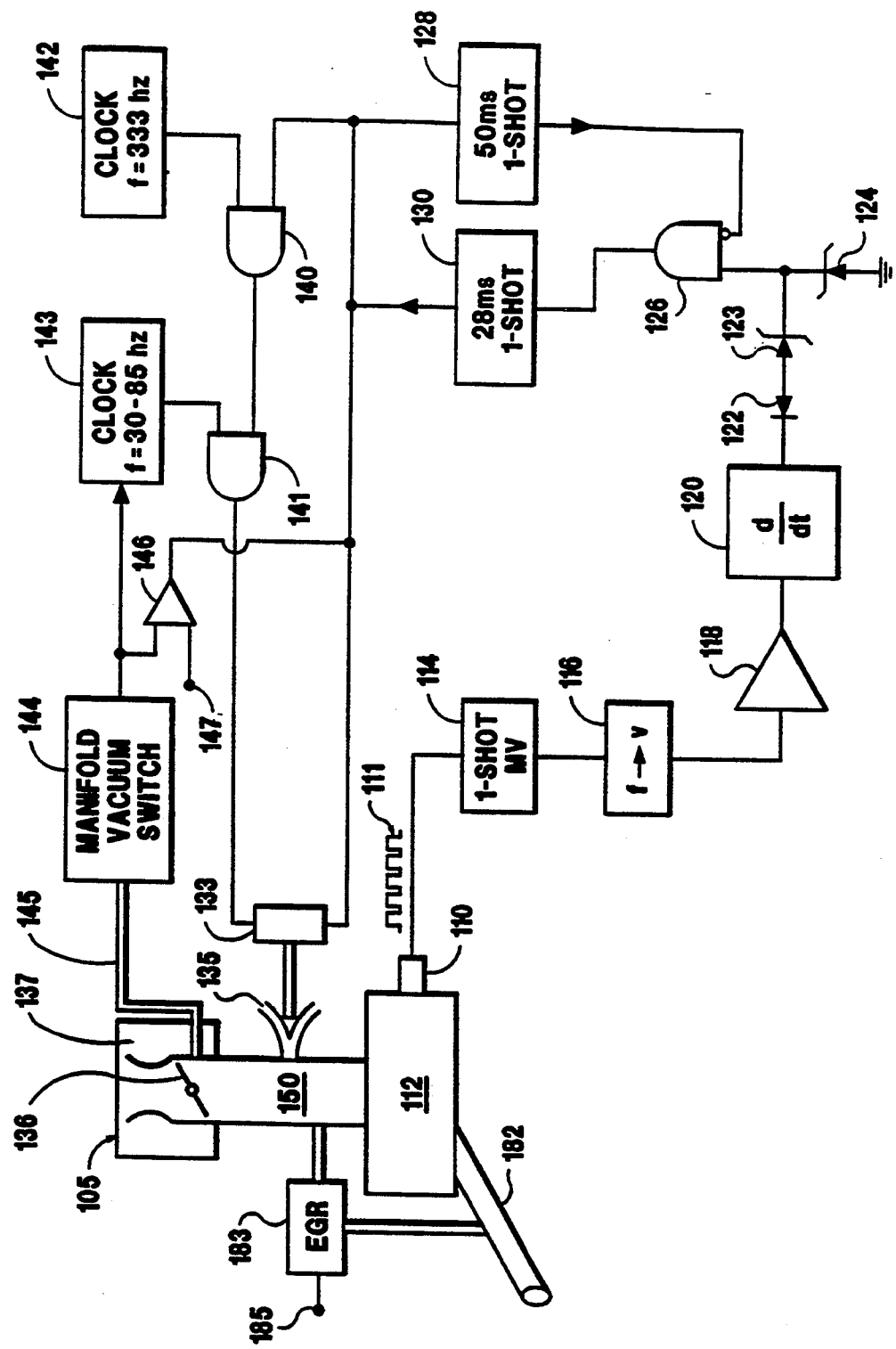
FIG. 15 is a logic diagram of the lean burn mixture control system of the present invention in combination with exhaust gas recirculation.

FIG. 15 illustrates schematically the combination of an exhaust gas recirculation (EGR) system with the mixture control system of the present invention. The EGR system includes an EGR valve 183 which is operated by a control signal 185. When the EGR valve 183 is opened, engine exhaust from exhaust manifold 182 is allowed to flow through the EGR valve 183 into engine intake inlet 150 for emission control purposes.

The control signal 185 for controlling the onset and quantity of EGR may be either electric or pneumatic and typically consists of a pneumatic signal obtained from ported vacuum. In this way, the EGR valve 183 begins to open as the throttle plate 136 is advanced beyond idle, and closes as the throttle plate 136 approaches wide-open. The control signal 185 also typically includes a temperature input to disable the EGR during periods when the engine is cold, and sometimes disable the EGR when the engine is unusually hot. A more advanced EGR system which may be used with the present invention also includes an exhaust pressure input for the control signal 185. The EGR valve 183 may contain an integral exhaust pressure sensor which is used to enable the opening of the EGR valve 183 only after a pre-set level of exhaust pressure has been exceeded. The control signal 185, as shown in FIG. 15, represents any or all of these inputs of known EGR systems.

The combination of the present invention with an EGR system is particularly useful for reducing undesirable side effects of the EGR system. As discussed above, EGR tends to inhibit the engine's ability to tolerate lean mixtures. The mixture control system of the present invention ensures acceptable drivability by automatically providing the leanest air-to-fuel ratio consistent with a maximum level of cyclic combustion variability. When higher amounts of EGR are used, the mixture controller of this invention automatically compensates, if necessary, by adjusting the air-to-fuel ratio to avoid poor drivability.

Figure 16:
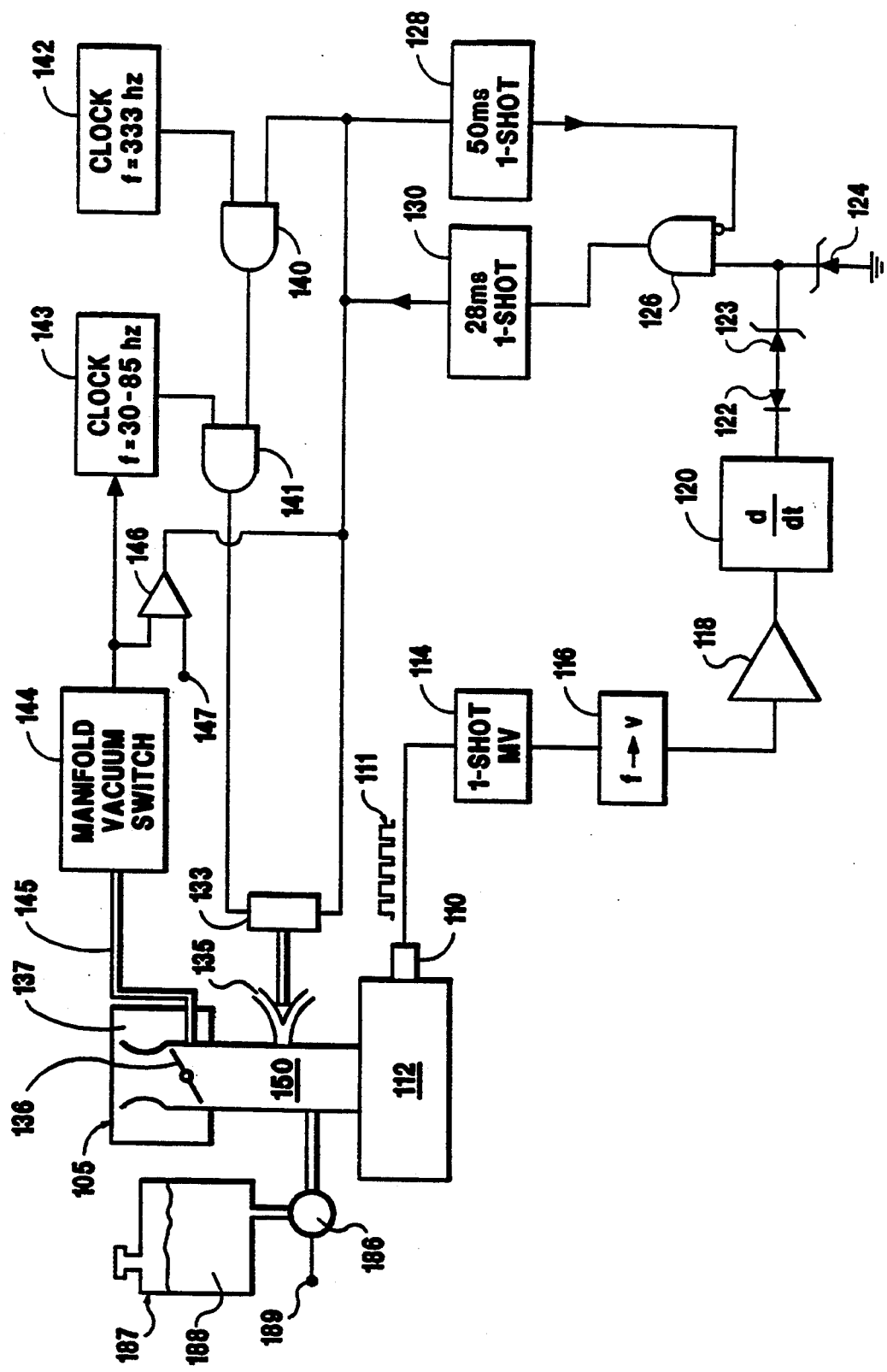
FIG. 16 is a logic diagram of the lean burn mixture control system of the present invention in combination with water injection.

FIG. 16 illustrates schematically the combination of a water injection system with the mixture control system of the present invention. The water injection system includes a water valve 186 operated by a control signal 189. When the water valve 186 is opened, water 188 from a water reservoir 187 is allowed to flow through the water valve 186 into the engine intake inlet 150. As previously known, the water injection tends to suppress engine knock and enhance power of the engine.

The control signal 189 for controlling the onset and quantity of water injection typically consists of a pneumatic or electrical signal obtained from engine vacuum or throttle position. In this way, the flow of water begins as the throttle 136 is advanced to the operating range approaching full power. The control signal 189 typically allows the onset of water injection to begin at approximately half throttle. At this power level, the control system of the present invention provides a lean mixture, consistent with the level of water injection.

The combination of the present invention with a water injection system is particularly useful for reducing the undesirable side effects and for improving the performance of the water injected engine. As with EGR, water injection tends to spoil the engine's tolerance for lean mixtures. The lean mixture control system of the present invention ensures acceptable drivability by automatically providing the leanest air-to-fuel ratio consistent with a maximum level of cyclic combustion variability. When higher amounts of water injection are used, the mixture controller of this invention automatically compensates, if necessary, by adjusting the air-to-fuel ratio to avoid poor drivability.

While there has been illustrated and described particular embodiments of the present invention, it will be appreciated that numerous changes and modifications will occur to those skilled in the art, and it is intended in the appended claims to cover all those changes and modifications which fall within the scope of the present invention.

What is claimed as new and desired to be secured by Letters Patent of the United States is:

1. An engine having a control system for controlling a ratio of a fuel/air mixture applied to said engine, comprising:
    means for adjusting the ratio of fuel-to-air in said engine;
    first controlling means for controlling said ratio adjusting means;
    second controlling means for controlling said ratio adjusting means, said second controlling means including an adjustable clock means to generate input timing signals at a preselected frequency wherein the frequency of said input timing signals may be varied;
    measuring means for measuring the power requirements of said engine, said measuring means further including means for generating a signal of said power requirements and sending said signal to said second controlling means;
    said frequency of said adjustable clock means being controlled by the signal from said measuring means to decrease the frequency of said timing signals as the power requirement decreases;
    wherein said first controlling means operates said ratio adjusting means to provide a rich ratio to said engine upon receipt of a signal from said measuring means indicative of a power requirement above a first predetermined value, corresponding generally to said engine being operated at full throttle; and
    further wherein said second controlling means, upon receipt of a signal from said measuring means indicative of a power requirement below said first predetermined value, operates said ratio adjusting means to provide a lean ratio to said engine which is enriched as said power requirement, and hence, the frequency of said timing signals, decreases.

2. The engine of claim 1, wherein said frequency of said adjustable clock means is decreased in a step manner.

3. The engine of claim 1, wherein said frequency of said adjustable clock means comprises two pre-set fixed frequencies, said clock means being adjusted between said two pre-set fixed frequencies in a single step.

4. The engine of claim 3, wherein said two pre-set fixed frequencies are within a range of 30 hertz to 85 hertz.

5. The engine of claim 4, wherein said two pre-set fixed frequencies are 75 hertz and 50 hertz, respectively.

6. An engine having a control system for controlling a ratio of a fuel/air mixture applied to said engine, comprising:
    means for adjusting the ratio of fuel-to-air in said engine;
    first controlling means for controlling said ratio adjusting means;
    second controlling means for controlling said ratio adjusting means, said second controlling means including an adjustable clock means to generate input timing signals at a preselected frequency wherein the frequency of said input timing signals may be varied;
    measuring means for measuring the power requirements of said engine, said measuring means further including means for generating a signal of said power requirements and sending said signal to said second controlling means;
    said frequency of said adjustable clock means being controlled by the signal from said measuring means to decrease the frequency of said timing signals as the power requirement decreases;
    wherein said first controlling means operates said ratio adjusting means to provide a rich ratio to said engine upon receipt of a signal from said measuring means indicative of a power requirement above a first predetermined value, corresponding generally to said engine being operated at full throttle;
    further wherein said second controlling means, upon receipt of a signal from said measuring means indicative of a power requirement below said first predetermined value, operates said ratio adjusting means to provide a lean ratio to said engine which is enriched as said power requirement, and hence, the frequency of said timing signals, decreases; and
    further wherein said first controlling means includes a vacuum operated control valve.

7. The engine of claim 6, wherein said engine includes a throttle, said ratio adjusting means includes means for introducing secondary air into said engine, and said vacuum operated control valve includes means for preventing said secondary air from entering said engine when said throttle is in a fully open position.

8. The engine of claim 7, wherein said vacuum operated control valve further includes means for preventing said secondary air from entering said engine when said throttle is in a fully closed position.

9. A control system for regulating the introduction of secondary air into an engine for controlling a ratio of a fuel/air mixture applied to the engine, comprising:
    a first valve assembly having an adjustable opening for introducing secondary air into the engine;
    means for adjusting the opening of the first valve means in response to a sensed engine condition to change the ratio of the fuel/air mixture; and
    a second valve assembly having an open position and a closed position, said second valve assembly being located between said first valve assembly and an opening into the engine, said second valve assembly allowing secondary air to enter the engine while in said open position and blocking secondary air from entering the engine while in said closed position.

10. The control system of claim 9, wherein said second valve assembly includes a vacuum inlet, said second valve assembly being movable to its open position when a vacuum level at said vacuum inlet is above a predetermined level, and being movable to its closed position when a vacuum level at said vacuum inlet is below said predetermined level.

11. The control system of claim 10, wherein said second valve assembly includes a diaphragm and a perforated baffle, said diaphragm being movable into engagement with said perforated baffle to block air flow through said second valve assembly when a vacuum level at said vacuum inlet is below said predetermined level.

12. The control system of claim 11, wherein said perforated baffle includes a large central hole and a plurality of smaller holes, whereby secondary air travels through said second valve assembly by entering through said large central hole and exiting through said plurality of smaller holes when said diaphragm is moved out of engagement with said baffle.

13. An engine having a control system for controlling valve means in said engine to alter the ratio of the fuel-/air mixture applied to said engine, comprising:

means for controlling said valve means to alter said ratio of the fuel/air of said mixture wherein said controlling means generally is changing said ratio of said mixture at a first rate and in a leaner direction;

means for detecting the occurrence of deceleration in said engine above a set value indicative of a weak combustion event, said detection means further having means for generating a signal and sending said signal to said controlling means when said deceleration above said set value is detected; and said controlling means, upon receipt of said signal, changing said ratio of said mixture at a second rate and in a richer direction for a predetermined period of time, said second rate being faster than said first rate, after which said period of time said controlling means again changes said ratio at said first rate and in said leaner direction; and further wherein said valve means is at least one fuel injector.

14. The engine of claim 13, wherein said valve means includes a plurality of fuel injectors.

15. The engine of claim 14, wherein a quantity of fuel injected by each of said fuel injectors is individually controlled by said control system.

16. A control system for controlling a ratio of fuel/air mixture applied to a multi-cylinder engine, comprising:

a plurality of fuel injectors, each fuel injector corresponding to an individual cylinder of the engine;

means for individually detecting weak combustion in each individual cylinder of the engine and for generating a signal indicative of said weak combustion; and control means for individually controlling a quantity of fuel injected by a respective fuel injector into each individual cylinder based upon said signal.

17. The control system of claim 16, wherein said detecting means detects the occurrence of deceleration of the engine above a set value indicative of weak combustion.

18. The control system of claim 16, wherein said control means individually adjusts a duration of fuel injection pulses of each fuel injector to change the ratio of fuel/air mixture.

19. The control system of claim 18, wherein said control means changes the ratio of the fuel/air mixture at a first rate and in a leaner direction when no signal indicative of weak combustion is detected.

20. The control system of claim 19, wherein said control means, upon receipt of said signal indicative of weak combustion, changes the ratio of fuel/air mixture at a second rate and in a richer direction for a predetermined period of time.

21. The control system of claim 20, wherein said control system includes an engine position sensor for sensing a rotative position of the engine when said weak combustion is detected.

22. A method for controlling a ratio of fuel/air mixture applied to a multi-cylinder engine, comprising the steps of:

providing a plurality of fuel injectors, each fuel injector corresponding to an individual cylinder of the engine;

detecting deceleration of the engine indicative of a weak combustion event and generating a signal indicative of said weak combustion event;

sensing a rotative position of the engine at the time said weak combustion event is detected;

selecting a fuel injector corresponding to a cylinder in which the weak combustion event occurred based upon the sensed rotative position of the engine at the time the weak combustion signal was detected; and individually adjusting a quantity of fuel injected by said selected fuel injector.

23. The method of claim 22, wherein said adjusting step comprises individually adjusting a duration of fuel injection pulses of the fuel injectors to change the ratio of the fuel/air mixture.

24. The method of claim 23, wherein said adjusting step further comprises changing the ratio of the fuel/air mixture at a first rate in a leaner direction in each cylinder in which a weak combustion event is not detected, and changing the ratio of the fuel/air mixture at a second faster rate for a predetermined period of time in a richer direction in each cylinder in which a weak combustion event is detected.

25. An engine having a control system for controlling a valve means in said engine to alter the ratio of the fuel/air mixture applied to said engine, comprising:

means for controlling said valve means to alter said ratio of the fuel/air of said mixture wherein said controlling means generally is changing said ratio of said mixture at a first rate and in a leaner direction;

means for detecting the occurrence of deceleration in said engine above a set value indicative of a weak combustion event, said detection means further having means for generating a signal and sending said signal to said controlling means when said deceleration above said set value is detected;

said controlling means, upon receipt of said signal, changing said ratio of said mixture at a second rate and in a richer direction for a predetermined period of time, said second rate being faster than said first rate, after which said period of time said controlling means again changes said ratio at said first rate and in said leaner direction; and a water injection means for injecting water into the engine while said control system regulates the ratio of the fuel/air mixture applied to the engine.

26. An engine having a control system for controlling a valve means in said engine to alter the ratio of the fuel/air mixture applied to said engine, comprising:

means for controlling said valve means to alter said ratio of the fuel/air of said mixture wherein said controlling means generally is changing said ratio of said mixture at a first rate and in a leaner direction;

means for detecting the occurrence of deceleration in said engine above a set value indicative of a weak combustion event, said detection means further having means for generating a signal and sending said signal to said controlling means when said deceleration above said set value is detected;

said controlling means, upon receipt of said signal, changing said ratio of said mixture at a second rate and in a richer direction for a predetermined period of time, said second rate being faster than said first rate, after which said period of time said controlling means again changes said ratio at said first rate and in said leaner direction; and an exhaust gas recirculation system for recirculating exhaust gas into the engine while said control system regulates the ratio of the fuel/air mixture applied to the engine.

* * * * *